United States Patent [19]

Madsen

[11] 3,878,413

[45] Apr. 15, 1975

[54] TURBO-GENERATOR, THE ROTOR OF WHICH HAS A DIRECT LIQUID-COOLED WINDING

[75] Inventor: Kristian Dahl Madsen, Vasteras, Sweden

[73] Assignee: Allmanna Svenska Elektriska Aktiebolaget, Vasteras, Sweden

[22] Filed: Feb. 5, 1974

[21] Appl. No.: 439,947

[30] Foreign Application Priority Data

Feb. 23, 1973 Sweden .............................. 7302556

[52] U.S. Cl. .................................................. 310/59
[51] Int. Cl. ............................................. H02k 9/00
[58] Field of Search ............. 310/54, 52, 58, 59, 61, 310/64, 65

[56] References Cited
UNITED STATES PATENTS

| | | | |
|---|---|---|---|
| 3,131,321 | 4/1964 | Gibbs | 310/54 |
| 3,145,314 | 8/1964 | Becker | 310/54 |
| 3,320,447 | 5/1967 | Banchieri | 310/61 |
| 3,353,043 | 11/1967 | Albright | 310/61 |
| 3,497,736 | 2/1970 | Cuny | 310/54 |
| 3,504,207 | 3/1970 | Tjernstrom | 310/54 |
| 3,543,062 | 11/1970 | Banchieri | 310/54 |
| 3,569,752 | 3/1971 | Tomlinson | 310/61 |
| 3,686,522 | 8/1972 | Konovalov | 310/59 |

Primary Examiner—R. Skudy

[57] ABSTRACT

The rotor of a turbo-generator has a direct liquid-cooled winding with cooling tubes of corrosion-resistant material in the conductor. The cooling tubes are connected to a corrosion-resistant distributing ring divided into sectors, and there are a plurality of axially running inlet and outlet tubes which are connected to the inlet and outlet sectors respectively. The sectors are connected by radial tubes arranged in the rotor shaft leading to inner and outer central tubes, respectively, which run axially in the rotor shaft. All the tubes are made of corrosion-resistant material. The radial tubes and the central tubes are arranged substantially without radial play in the rotor shaft. The radial tubes are of equal length and are attached in a radially inner wall of the distributing ring. The inner central tube in the shaft is sealed at its inner end and is provided with radially extending nozzles connected to some of the radial tubes. Each of the nozzles has a surface part at the radially outer end which seals against the corresponding surface part at the inside of the outer central tube. Others of the radial tubes are connected to the outer central tube.

1 Claim, 4 Drawing Figures

TURBO-GENERATOR, THE ROTOR OF WHICH HAS A DIRECT LIQUID-COOLED WINDING

BACKGROUND OF THE INVENTION

1. Field of the Invention

The present patent application relates to a turbo-generator, the rotor of which has a direct liquid-cooled winding with cooling tubes of corrosion-resistant material in the conductor, said cooling tubes being connected to a corrosion-resistant distributing ring, divided internally into sectors by means of electrically insulating spacing pieces, and a plurality of axially running inlet and outlet tubes which are connected to inlet and outlet sectors, respectively, which sectors are hydraulically connected, by means of first and second radial tubes arranged in the rotor shaft, to an inner tube and an outer central tube, respectively, running axially in the rotor shaft, all the tubes being made of corrosion-resistant material, and said radial tubes and said central tubes being arranged substantially without radial play in the rotor shaft, the radial tubes being mutually equally long and attached in the wall of said outer central tube and in a radially inner wall of said distributing ring which makes contact with the shaft.

2. The Prior Art

From the printed German patent application No. 1,233,056 it is known in principle to line axial and radial channels in the rotor shaft with tubes of corrosion-resistant material. However, this publication gives no solution to the problems regarding construction and assemblage which are associated with tubes of this kind.

U.S. Pat. No. 3,131,321 discloses a cooling system with coaxial, central tubes in the rotor shaft, which are connected by means of radial tubes to an annular distributing chamber bored in the shaft, said distributing chamber being sealed in the radial direction by a plurality of consecutively arranged ring segments which are surrounded by a solid steel ring. The construction has, among other things, the disadvantage that the distributing chamber cannot be manufactured separately, but must be made in direct connection with the rest of the rotor.

Swiss patent 447,353 describes a turbo-rotor with a water-distributing ring which is made separately and attached by screw bolts to the support ring of the retaining ring, so that it, similarly to the support ring, changes its diameter when affected by the centrifugal force. Both the central tubes and the radial tubes are arranged with a play with respect to the walls of the corresponding bores in the rotor shaft. Two pairs of diametrically arranged radial tubes are attached to the same outer central tube, while at the same time the pairs are differently connected in hydraulic respects. When the distributing ring is extended because of centrifugal forces, the outer central tube is then able to keep pace with the outwardly directed movements of the radial tubes with only elastic deformation (ovalization), provided that the two radial tube pairs are arranged at a sufficient distance from each other in the axial direction. According to the drawings of said patent, this distance (the center distance) is larger than twice the maximum inner radius of a radial tube, which means that the maximum axial dimension of the distributing ring (internally) must be greater than twice the maximum outer diameter of the radial tube. The drawing of said patent shows that the axial dimension is greater than twice this outer diameter. Such a dimensioning of the distributing ring cannot be avoided even if far greater tensile forces are allowed in the radial tubes, since one radial tube pair must be connected to an innermost, strongly extended part of the inner central tube, and the other radial tube pair must be connected to an axial part of the same central tube lying outside the extended part. A great axial extension of the distributing ring is a drawback since the required length of the shaft then increases and since the radially outer cylinder surface of the distributing ring then causes considerable problems concerning the structural strength.

Similarly to what is the case in a rotor according to the present application, but not in the rotor described in the British patent, all the radial tubes according to the Swiss patent are attached to the outer central tube. In all cases the radial tubes must be inserted by a radial, inwardly directed movement, which can be achieved particularly easily in the liquid-distributing ring included in a rotor according to the invention. Welding together of the tubes made of corrosion-resistant material in such a way that they form a coherent, completely water-tight system, cannot be effected when some of the radial tubes are so long that they pass the outer of two coaxial central tubes in the rotor shaft and are connected to the inner one, as shown in U.S. Pat. No. 3,131,321.

SUMMARY OF THE INVENTION

The above-mentioned drawbacks are avoided by means of the invention, which is characterised by the fact that the cooling tubes which are formed of corrosion-resistant material and which run in the windings are connected by insulating connecting members to inlet and outlet sectors respectively in the water-distributing ring which is on the outside of the rotor body. The sectors are divided from each other by radially extending walls, connecting outer and inner rings. The shaft is provided with inner and outer axially running tubes, the inner tube being closed at its inward end. Radial tubes connect between the inner tube and the outer tube respectively and the inlet and outlet sectors. The inner tube includes a sector-shaped part which seals against an inner surface of the radially extending outer tube.

BRIEF DESCRIPTION OF THE DRAWINGS

In the following the invention will be described with reference to the accompanying drawings, in which.

DESCRIPTION OF THE PREFERRED EMBODIMENTS

Figure 1:
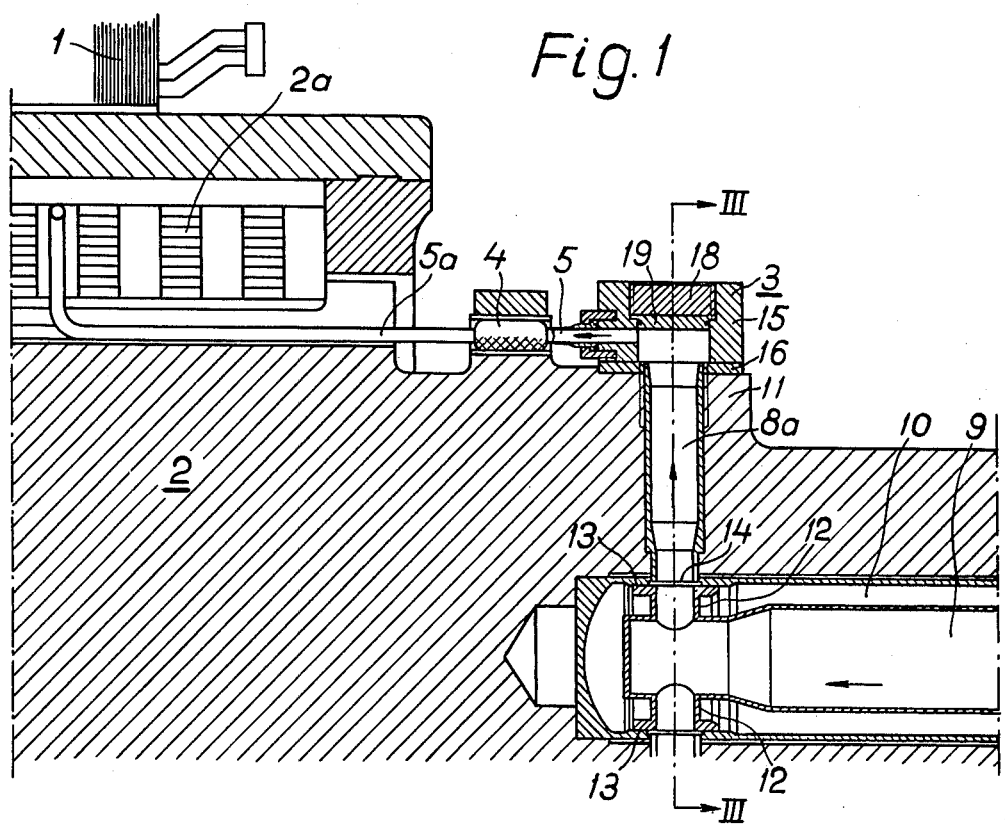
FIG. 1 shows the rotor of a turbo-generator in partial section through the center line of the rotor and FIG. 2 a detail of FIG. 1, namely a section along the line II — II of FIG. 3.
Figure 4:
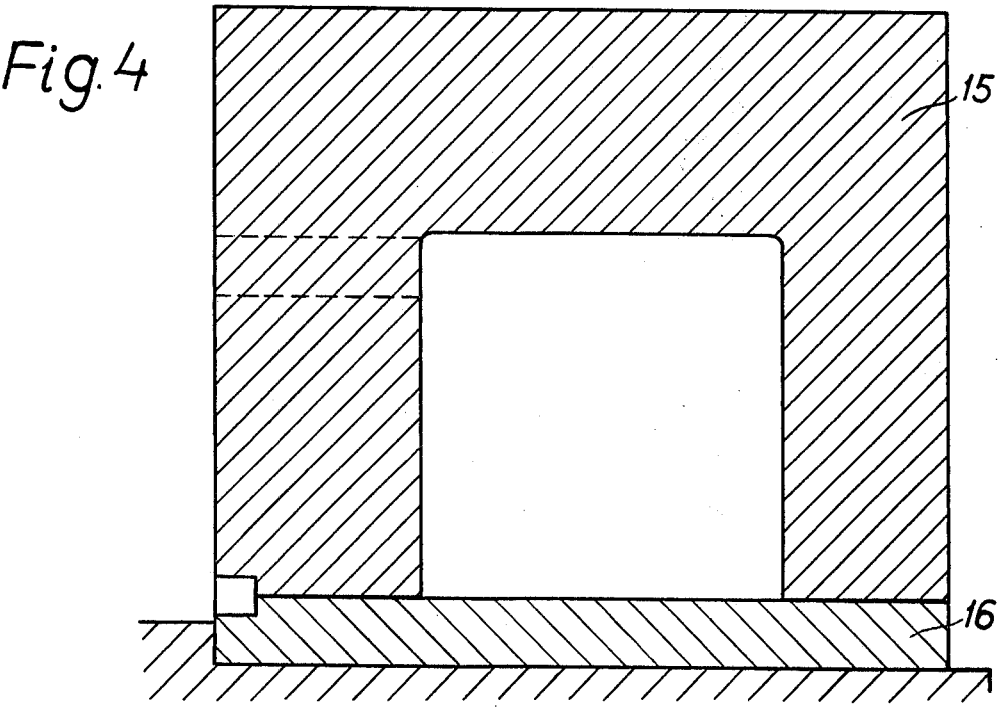
FIG. 4 is a cross-section along the line IV — IV of FIG. 3.
Figure 2:
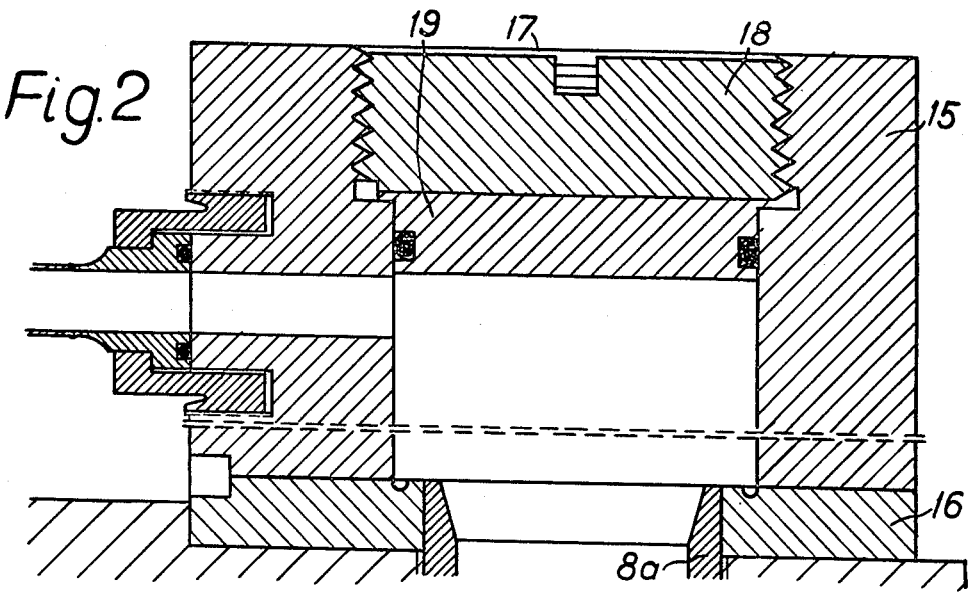
Figure 3:
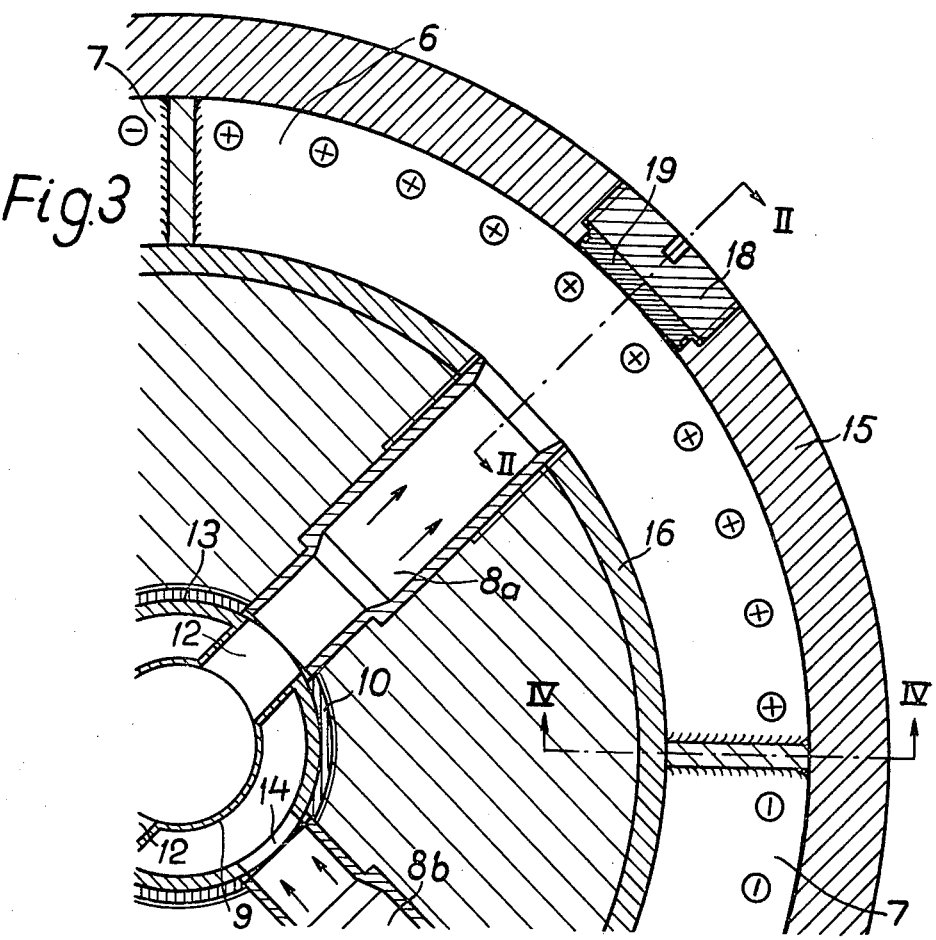
FIG. 3 is a cross-section along the line III — III of FIG. 1

In the drawings 1 designates the stator and 2 the rotor of a turbogenerator. The rotor 2 has a direct liquid-cooled winding 2a, which is hydrostatically connected to a water-distributing ring 3 by a plurality of axially running tubes 5a and 5, which are connected to each other by electrically insulating spacing pieces 4. The water-distributing ring 3 is divided into two inlet sectors 6 and two outlet sectors 7. It is welded together by the two stainless steel rings 15 and 16 by electron beam welding. Each of the inlet sectors are connected to a radial tube 8a welded to the ring 16, and each of the outlet sectors is connected to a radial tube 8b welded to the same ring. All the radial tubes 8a and 8b are led through bores in the rotor shaft and welded to an outer central tube 10, running axially in the shaft and surrounding the coaxially arranged inner central tube 9. Tube 9 is provided with two nozzles 12, each being formed to seal, at its radially outer end, against the inside of a portion of the central tube 10 which is provided with through-going holes, each of the nozzles thus being arranged to form a hydraulic connection with a central tube 8a. The surface of the nozzle making contact with the tube 10 consists, according to one embodiment of the invention (not shown in the drawings), only of an annular surface which on the whole corresponds to the cross-section of the nozzle 12. More advantageous, however, is the embodiment shown in FIG. 3, according to which the sealing surfaces are widely extended, thus constituting a cylindrical surface 13 making contact with the inner side of the tube 10. Apart from the nozzles 12, said surface 13 is only perforated by two holes 14. They are positioned exactly opposite corresponding holes of the tube 10. The cylinder defined by the surface 13 provides a very reliable centering of the central tube 9 and, at the same time, a good sealing. In addition to this it is possible to place an annular gasket in the space 14.

During the assembly the radial tubes 8a and 8b are inserted into the rotor shaft after the finished distributing ring 3 has been shrunk onto the rotor shaft. This insertion is made possible because the ring 15 formed with a U-formed cross-section is provided with a circular aperture 17 in the extension of each radial tube. A threaded cover 18 is screwed into the hole 17. The cover 18 is exposed to considerable strain due to the centrifugal force and it is therefore made of steel of high mechanical strength. The cooling system is made so as to prevent cooling water from coming into contact with other surfaces than those made of corrosion-resistant material. For that reason the cover 18 is protected against liquid by means of a grommet 19 which is made of stainless steel. The particular construction which is used, according to the invention, when it comes to the axially inner end portions of the central tubes, also provides the advantage from the point of view of assembly that the radial tubes, which are exactly alike with regard to shape and position, can be finally arranged in their positions and be firmly welded there, without causing any complication or inconvenience during the subsequent insertion of the central tubes.

I claim:

1. A turbo-generator rotor having a direct liquid-cooled winding with cooling tubes of corrosion-resistant material in the conductor, a corrosion-resistant distributing ring divided internally into sectors, electrically insulating spacing pieces connecting the cooling tubes to the sectors, said sectors including inlet and outlet sectors, the rotor having a shaft and inner and outer tubes of corrosion-resistant material extending axially within the shaft, first and second radial tube arranged in the rotor shaft, the first radial tube being connected to the inner axial tube and the second radial tube being connected to the outer axial tube, said radial tubes and said axial tubes being arranged substantially without radial play in the rotor shaft, the radial tubes being of equal length, the distributing chamber having an inner wall, the radial tubes being connected at their outer ends in said inner wall, the inner axial tube being sealed at its inner end and having at least one radially extending nozzle connected to one of said axial tubes, said nozzle having a surface part at its free end which engages and seals against a corresponding surface part of the inside wall of the outer axial tube, the other radial tube being connected to the outer axial tube, the outer wall of the distributing ring being provided with a plurality of openings and screw covers mounted therein, said openings being located in radial alignment with the radial tubes and being concentric with the longitudinal axis of the tubes.

* * * * *